United States Patent
Madigan

(10) Patent No.: US 9,792,713 B1
(45) Date of Patent: *Oct. 17, 2017

(54) PHOTOGRAPHY SYSTEM AND METHOD

(71) Applicant: Richard Madigan, Foxboro, MA (US)

(72) Inventor: Richard Madigan, Foxboro, MA (US)

(73) Assignee: Accutech Packaging, Inc., Foxboro, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/346,984

(22) Filed: Nov. 9, 2016

Related U.S. Application Data

(63) Continuation of application No. 14/631,965, filed on Feb. 26, 2015, now Pat. No. 9,524,576.

(60) Provisional application No. 61/946,001, filed on Feb. 28, 2014.

(51) Int. Cl.
*G06K 9/00* (2006.01)
*G06T 11/60* (2006.01)
*G06T 7/00* (2017.01)

(52) U.S. Cl.
CPC ............ *G06T 11/60* (2013.01); *G06T 7/0081* (2013.01)

(58) Field of Classification Search
CPC ........... H04N 13/0445; H04N 13/0447; H04N 21/4316; G09F 19/14; G09F 15/02; G09F 11/26; G06F 3/14; G06K 15/02; G09G 2340/12; G09G 3/003; G09G 5/377; G02B 27/2214

See application file for complete search history.

(56) References Cited

U.S. PATENT DOCUMENTS

| | | | |
|---|---|---|---|
| 735,486 A | 8/1903 | Fels | |
| 757,549 A | 4/1904 | Gould | |
| 5,695,346 A | 12/1997 | Sekiguchi et al. | |
| 5,711,101 A | 1/1998 | Mueller et al. | |
| 6,026,215 A | 2/2000 | Fantone et al. | |
| 6,306,485 B1 | 10/2001 | Keller | |
| 6,373,637 B1 | 4/2002 | Gulick, Jr. et al. | |
| 6,829,851 B2 | 12/2004 | Oross et al. | |
| 7,359,120 B1 | 4/2008 | Raymond et al. | |
| 7,478,491 B2 | 1/2009 | Sturba et al. | |
| 7,644,527 B2 | 1/2010 | Clark et al. | |
| 9,132,691 B2 | 9/2015 | Hirsch et al. | |
| 2003/0107804 A1 | 6/2003 | Dolgoff | |
| 2004/0211099 A1 | 10/2004 | Therrell et al. | |
| 2005/0217154 A1 | 10/2005 | Rodriguez | |
| 2006/0103752 A1 | 5/2006 | Rai et al. | |
| 2006/0227427 A1 | 10/2006 | Dolgoff | |
| 2008/0080058 A1 | 4/2008 | Raymond | |
| 2009/0303401 A1 | 12/2009 | Roosendaal et al. | |
| 2011/0013286 A1 | 1/2011 | Chen et al. | |

(Continued)

*Primary Examiner* — Li Liu
(74) *Attorney, Agent, or Firm* — Salter & Michaelson

(57) ABSTRACT

A photograph display apparatus and associated method of display that includes a substrate having a mounting surface and a rib structure mounted on the mounting surface of the substrate. The rib structure is constructed and arranged to form a series of juxtaposition ribs formed in a parallel array including successive rib peaks. A composite photograph that includes alternating photograph segments of respective first and second photograph is formed in a folded array that includes fold lines that correspond to a demarcation line between respective photograph segments. The folded composite photograph is constructed and arranged for mating support to the rib structure.

21 Claims, 9 Drawing Sheets

(56) References Cited

U.S. PATENT DOCUMENTS

2012/0140333 A1 6/2012 Tomczyk et al.
2013/0258410 A1 10/2013 Shirotori

PHOTOGRAPHY SYSTEM AND METHOD

RELATED CASES

Priority for this application is hereby claimed under 35 U.S.C. §119(e) to commonly owned and U.S. Provisional Patent Application No. 61/946,001 which was filed on Feb. 28, 2014 and which is incorporated by reference herein in its entirety.

FIELD OF THE INVENTION

The present invention relates in general to an improved photography system, method of displaying photographs and a kit used in practicing the present invention. More particularly, the present invention relates to a photography system that is adapted for the display of multiple photographs, particularly two photographs. Even more particularly, the present invention relates to a photography system that is adapted for the display of two photographs viewed at opposed angles to the viewing site.

BACKGROUND OF THE INVENTION

Presently, photographs that are taken are displayed in a frame structure that may contain one or more photographs. However, there does not presently exist a system in which photographs can be merged and yet effectively displayed. In particular, there does not presently exist a means for the display of multiple photographs in effectively one frame structure.

Accordingly, it is an object of the present invention to provide an improved photography system and associated method in which multiple photographs can be displayed in a single frame structure.

Another object of the present invention is to provide an improved photography system and method where, in particular, two photographs can be effectively displayed in a single frame structure, to be observed at different transverse angles to the displayed composite display structure.

SUMMARY OF THE INVENTION

To accomplish the foregoing and other objects, features and advantages of the present invention there is provided a system for merging multiple photographs that includes a first register for storing a first photograph; a second register for storing a second photograph; a first separation controller coupled from said first register for establishing a series of vertically-arranged first photograph segments of the first photograph; a second separation controller coupled from said second register for establishing a series of vertically-arranged second photograph segments of the second photograph; and a multiplexer for receiving the respective vertically-arranged first and second photograph segments, mixing the respective vertically-arranged first and second photograph segments, and alternating the placement of the respective vertically-arranged first and second photograph segments to form, from the respective vertically-arranged first and second photograph segments, a composite photograph in which the respective vertically-arranged first and second photograph segments alternate in position across a width of the composite photograph.

In accordance with other aspects of the present invention the first and second photographs are stored in a digital format; the first separation controller includes a first digital memory storage; the second separation controller includes a second digital memory storage; including an output storage for receiving the composite photograph; in combination with a support substrate for the composite photograph; wherein the support substrate includes a rib structure mounted on a mounting surface of the substrate, said rib structure constructed and arranged to form a series of juxtaposition ribs formed in a parallel array; and wherein the composite photograph is formed in a folded array that includes fold lines that correspond to a demarcation line between respective photograph segments, said folded composite photograph constructed and arranged for mating support to said rib structure.

In accordance with another version of the present invention there is provided a method for merging multiple photographs comprising the steps of: storing a first photograph; storing a second photograph; converting the first photograph in order to establish a series of vertically-arranged first photograph segments of the first photograph; converting the second photograph in order to establish a series of vertically-arranged second photograph segments of the second photograph; and mixing the respective vertically-arranged first and second photograph segments by alternating the placement of the respective vertically-arranged first and second photograph segments to form, from the respective vertically-arranged first and second photograph segments, a composite photograph in which the respective vertically-arranged first and second photograph segments alternate in position across a width of the composite photograph.

In accordance with other aspects of the present invention the first and second photographs are stored in a digital format; the step of converting the first photograph includes providing a first digital memory storage; the step of converting the second photograph includes providing a second digital memory storage; including supporting the composite photograph in a folded manner including fold lines provided between adjacent photograph segment pairs; and including providing a rib structure mounted on a mounting surface of the substrate, said rib structure constructed and arranged to form a series of juxtaposition ribs formed in a parallel array.

In accordance with another version of the present invention there is provided a photograph display apparatus comprising a substrate having a mounting surface and a rib structure mounted on the mounting surface of the substrate. The rib structure is constructed and arranged to form a series of juxtaposition ribs formed in a parallel array including successive rib peaks. A composite photograph, that includes alternating photograph segments of respective first and second photograph, is formed in a folded array that includes fold lines that correspond to a demarcation line between respective photograph segments. The folded composite photograph is constructed and arranged for mating support to the rib structure.

In accordance with other aspects of the present invention the substrate mounting surface is substantially planar; the rib structure forms a saw tooth pattern with the demarcation line being defined between respective teeth of the saw tooth pattern; the rib structure is formed as a single rib structure disposed across the entire width of the substrate; the rib structure is formed as a series of ribs spaced from each other; and the fold lines of the composite photograph correspond in location to peaks and valleys of the rib structure.

BRIEF DESCRIPTION OF THE DRAWINGS

It should be understood that the drawings are provided for the purpose of illustration only and are not intended to define the limits of the disclosure. In the drawings depicting the present invention, all dimensions are to scale. The foregoing and other objects and advantages of the embodiments described herein will become apparent with reference to the following detailed description when taken in conjunction with the accompanying drawings in which:

FIG. 10A is a further schematic illustration in a plan view showing the left and right viewing angles for the respective photos to be observed;

DETAILED DESCRIPTION

Figure 7:
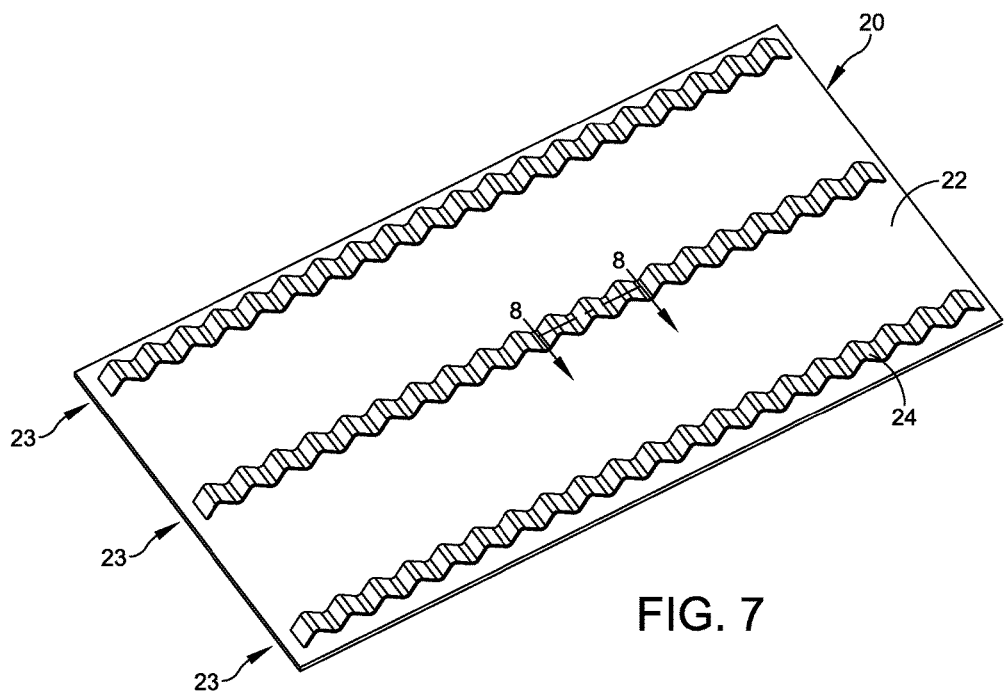
FIG. 7 is a perspective view of one embodiment of the mounting substrate of the present invention.
Figure 8:
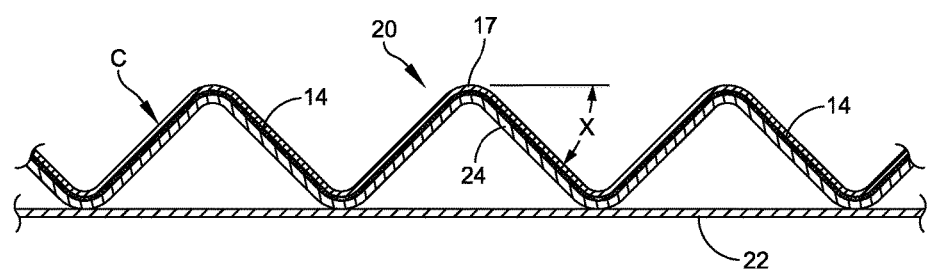
FIG. 8 is a cross-section view taken along line 8-8 of FIG. 7 and also including the mounted photograph.
Figure 10:
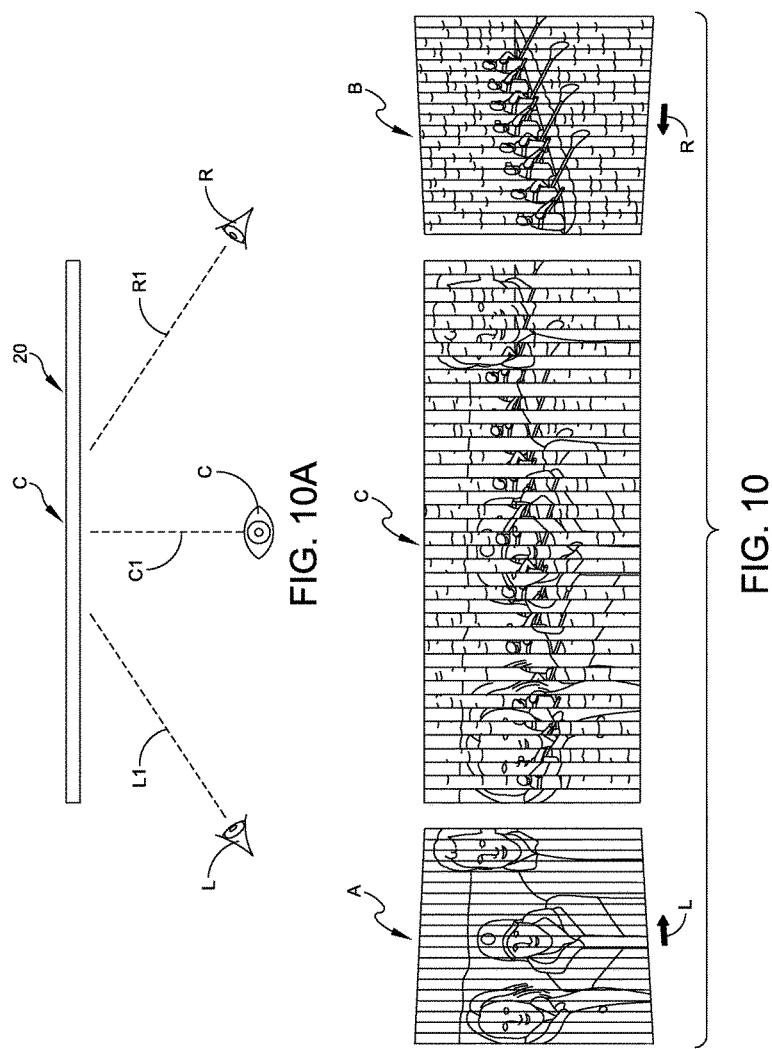
FIG. 10 is an illustrative diagram showing photographs A and B as well as the composite photograph C.

In accordance with the present invention there is provided a technique by which multiple photographs can be digitally stored and merged to provide a single larger photograph, such as illustrated in FIG. 10 herein. In accordance with the present invention this system includes a mounting substrate 20, such as illustrated in FIGS. 7 and 8, with preferably triangular supporting ribs. The digital storing of the photographs allows a mixing or merging step to take place to provide a composite photograph. This composite photograph is then scored at separate sequential photograph segments and mounted upon the mounting substrate. A viewing of the mounted composite shows one photograph at one lateral side and the other photograph at the opposed lateral side.

Figure 1:
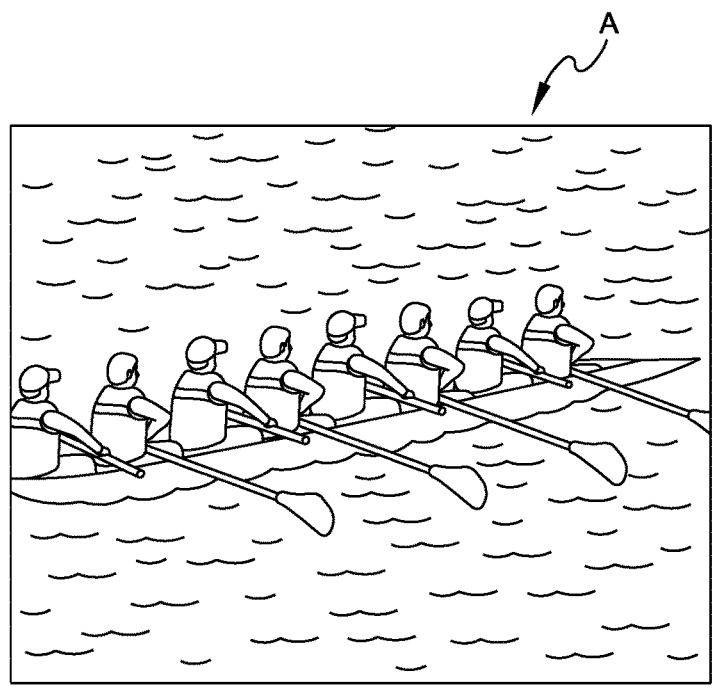
FIG. 1 is a view of a photograph A.
Figure 2:
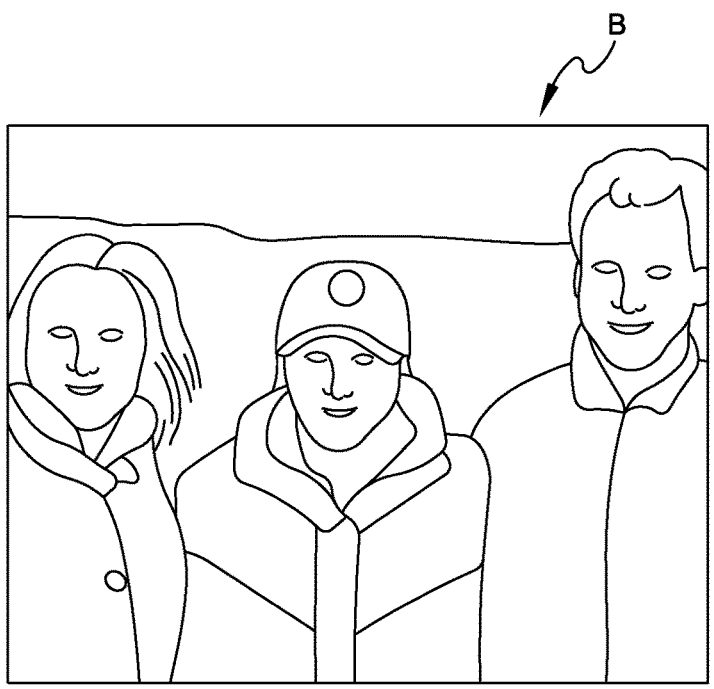
FIG. 2 is a view of a photograph B.

FIG. 1 is an illustration of a first photograph A. FIG. 2 is an illustration of a second photograph B. One of the purposes of the present invention is to have the ability to replicate these photographs in a different format such as the format illustrated in FIG. 10 wherein one of the photographs is viewed from the left as indicated by arrow L and the other photograph is observed from the right as indicated by the arrow R. It can be seen from FIG. 10 that the composite photograph C is illustrated as viewed directly from the front. This particular composite photograph is meant to be mounted to the mounting substrate 20 that is described in detail hereinafter. By this particular mounting arrangement, when one views the photograph mounted on the substrate at a left angular position one can observe, for example, photograph B. Similarly, when one observes the mounting substrate with the photograph attached at a right angular position as indicated in FIG. 10, this is a viewing of photograph A. These physical observation angles are approximately 45 degrees or preferably slightly less than 45 degrees at an angle, to be described hereinafter, that is in a range of 40-43 degrees.

For a further understanding of the respective photograph viewing positions refer also to FIG. 10A which is basically a plan view showing the main planar substrate at 20 and the three viewing angles indicated by a line of sight L1 wherein photograph B is viewed, as depicted in FIG. 10 at the right; a line of sight R1 wherein photograph A is viewed, as depicted in FIG. 10 at the left; and a direct line of sight C1 wherein the composite photograph can be viewed, as depicted in FIG. 10 at the center.

Figure 3:
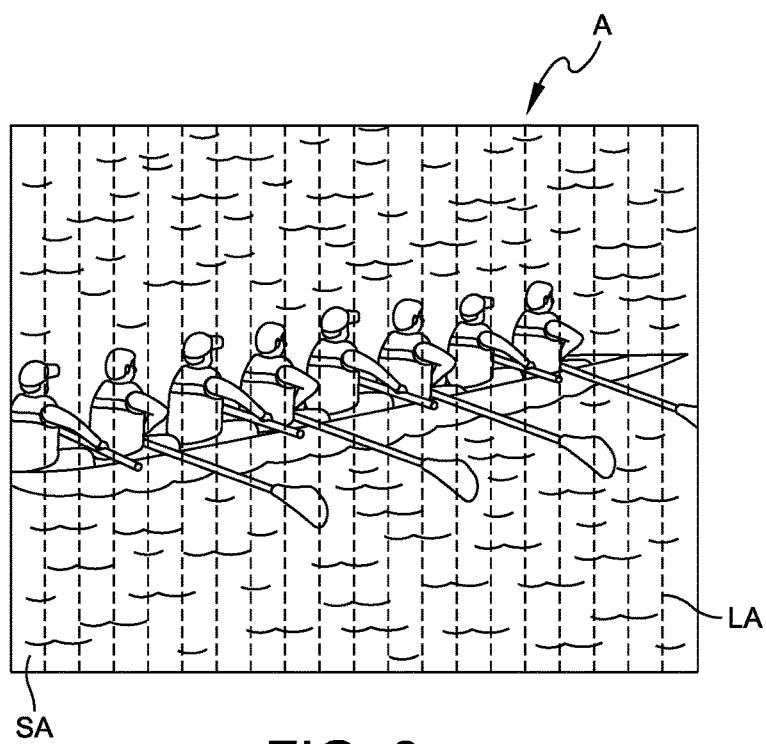
FIG. 3 illustrates the photograph A of FIG. 1 with score lines.
Figure 4:
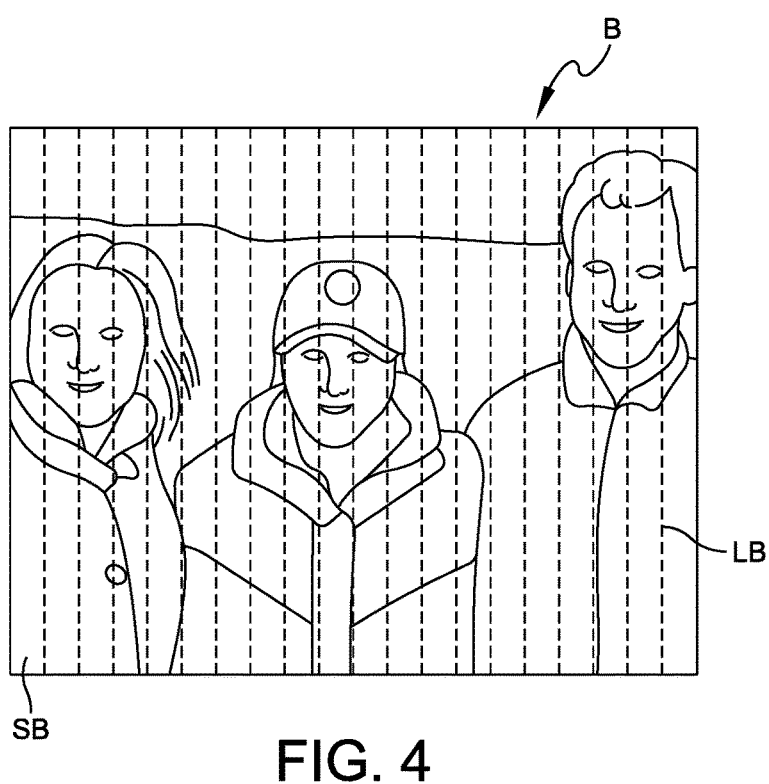
FIG. 4 illustrates the photograph B of FIG. 2 with score lines.

Reference is now made to FIGS. 3 and 4 which are basically replications of FIGS. 1 and 2, respectively. However, for illustration purposes, photograph A includes score lines LA and photograph B includes score lines LB. These score lines are illustrated for the purpose of separating each of the photographs into multiple segments SA and SB, respectively. In accordance with the concepts of the present invention, these segments SA and SB are then sequentially generated as per the composite photograph C of FIG. 5. It can be readily observed in FIG. 5 that the respective segments SA and SB from FIGS. 3 and 4 alternate in sequence across the breadth BR of the diagram of FIG. 5. These segments correspond in total to the total of the segments of FIGS. 3 and 4 combined. These may also be referred to as segments $SA_1$ to $SA_n$ related to photograph A and segment $SB_1$ to $Sb_n$ related to photograph B. For simplicity in FIG. 5 the different segments are shown in alternating herring bone patterns, but it is understood that a different pattern from respective photographs is found in each separate segment. This is illustrated in the top left corner of FIG. 5.

Figure 11:
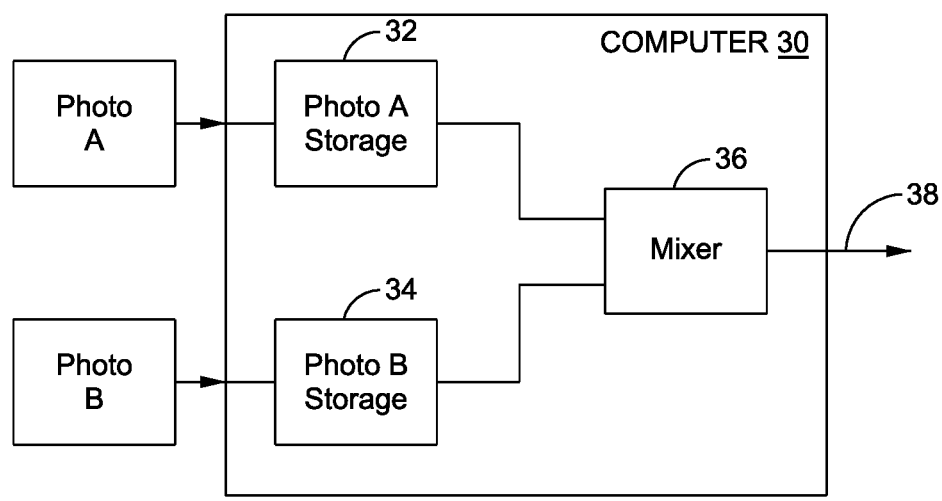
FIG. 11 is an electronic block diagram helpful in explaining the principles of the present invention.

In accordance with the present invention, the photographs such as illustrated in FIGS. 1 and 2 are each considered as digitally stored. In this regard refer to the block diagram of FIG. 11 that shows photo A and photo B as coupled to the computer device 30. The device 30 may be any one of a number of different computer processing machines. Computer 30 has the capability of receiving and storing the respective photos A and B as indicated by respective digital storage devices 32 and 34. Also illustrated in FIG. 11 is a mixer or multiplexer 36 that is capable of providing the composite photograph of FIG. 5 with the alternating images at segments SA and SB. This composite signal is illustrated at the output 38 in FIG. 11.

Thus, in accordance with the present invention, the photographs A and B are meant to be digitally configured as depicted in FIG. 11. The composite signal C, as indicated previously, represents the composite photograph of FIG. 5. In accordance with one embodiment of the present invention this photograph C can simply be printed out on a conventional printer and then scored on each of the score lines 10. Alternatively, a template 15 as illustrated in FIG. 6 with the score lines 16 demarcated thereon may be employed. The template 15 is used as the printing media and thus when the composite signal is printed out, it is formed on the template 15 having the score lines already existing and demarcating between the different segments SA and SB.

Figure 9:
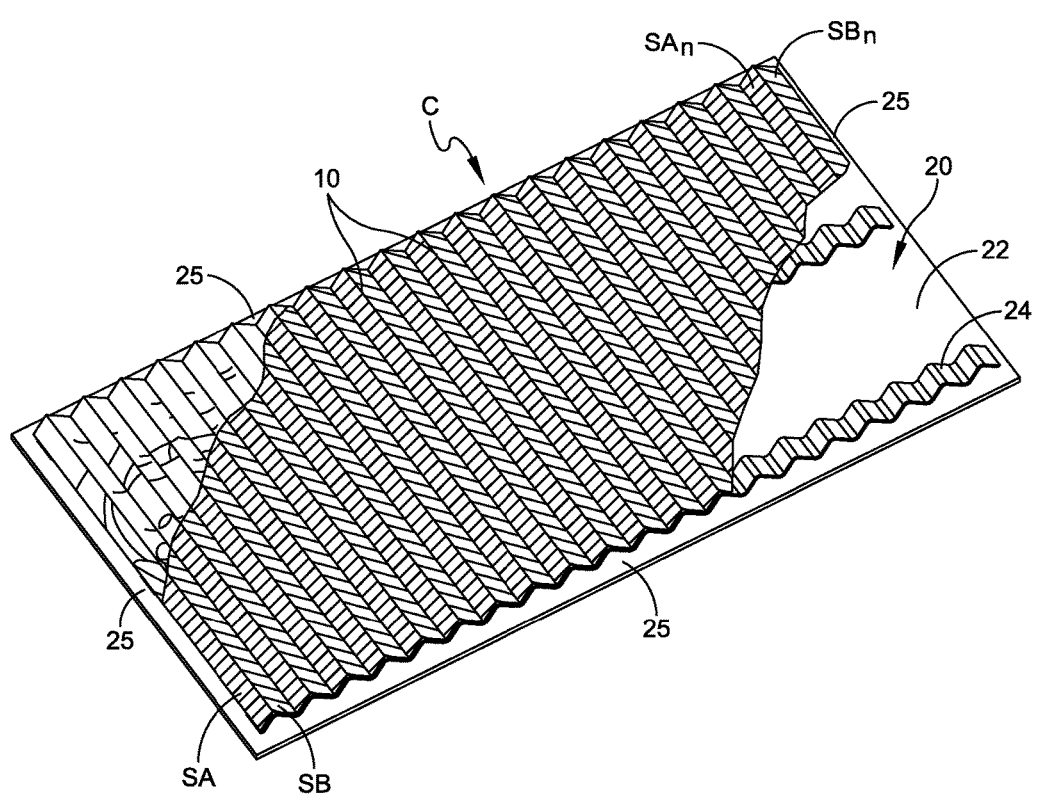
FIG. 9 is a perspective view similar to that illustrated in FIG. 7 but with the added and scored composite photograph mounted to the substrate.

Reference is now made to FIG. 7 for an illustration of the mounting substrate 20 of the present invention. The mounting substrate 20 may have a size slightly larger than the boundaries of the composite photograph of FIG. 5. In this regard refer also to the perspective view of FIG. 9 showing an additional peripheral frame area 25 where some type of a frame (not shown) may be attached and associated with the photograph and template.

Figure 7A:
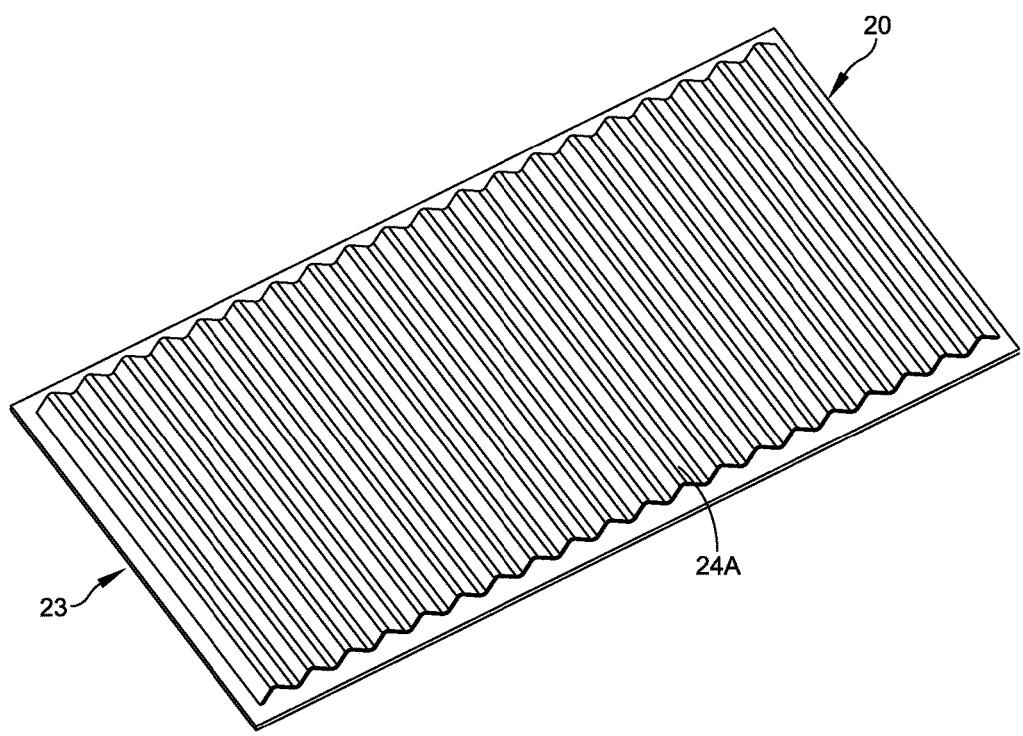
FIG. 7A is a perspective view of an alternate embodiment of the mounting substrate of the present invention.

In FIG. 7 the diagram of the mounting substrate is illustrated by three spaced apart rows 23 with each row containing sequential triangular-shaped ribs 24. Refer also to the cross-sectional view of FIG. 8 taken along line 8-8 of FIG. 7. In an alternate embodiment of the present invention, as illustrated in FIG. 7A, rather than using three spaced apart and separate rows 23, one could provide a mounting substrate 20 with a single saw-tooth pattern 24A in which the triangular ribs each extend transversely across substantially the entire width of the mounting substrate 20.

Figure 8A:
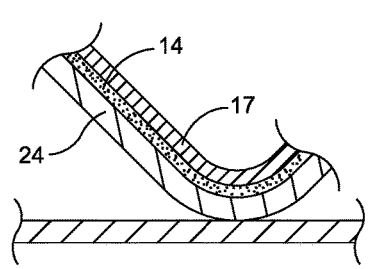
FIG. 8A is an enlarged fragmentary cross-section of the substrate and photograph with an adhesive therebetween.

FIG. 8 is a fragmentary cross-sectional view taken along line 8-8 of FIG. 7 for the purpose of illustrating the construction of the triangular ribs 24. FIG. 8A is an enlarged fragmentary cross-section of the substrate and photograph with an adhesive therebetween. FIGS. 8 and 8A illustrate the substrate supporting ribs at 24; the folded composite photograph at 17; and the adhesive at 14. As illustrated in FIG. 7, a series of these triangular ribs in essentially a saw-tooth pattern is disposed in separate rows 23. This series of triangular ribs 24 is aligned so that each of the peaks of the ribs is in alignment from row to row. For the embodiment of FIG. 7A with a single rib construction all peaks are in alignment. FIG. 8 illustrates a preferred angle of these ribs as angle X. This angle is preferably slightly less than 45 degrees and may be in a range of 40-43 degrees. The fragmentary cross-sectional view of FIG. 8A also illustrates an adhesive at 14 which represents the means by which the scored photograph C is mounted to the mounting substrate 20. In this regard, refer to the perspective view of FIG. 9 which illustrates the composite photograph C as mounted to the mounting substrate 20 such as with the use of an adhesive of some type. The adhesive may be applied uniformly or may be applied only at certain locations. The adhesive is to be applied sufficiently so as to hold the composite photograph effectively against and to all of the ribs of the mounting substrate 20. In FIG. 9 a herring bone pattern is used in order to simplify the diagram. However, each of the different alternating segments of the actual photograph segments is illustrated.

Figure 5:
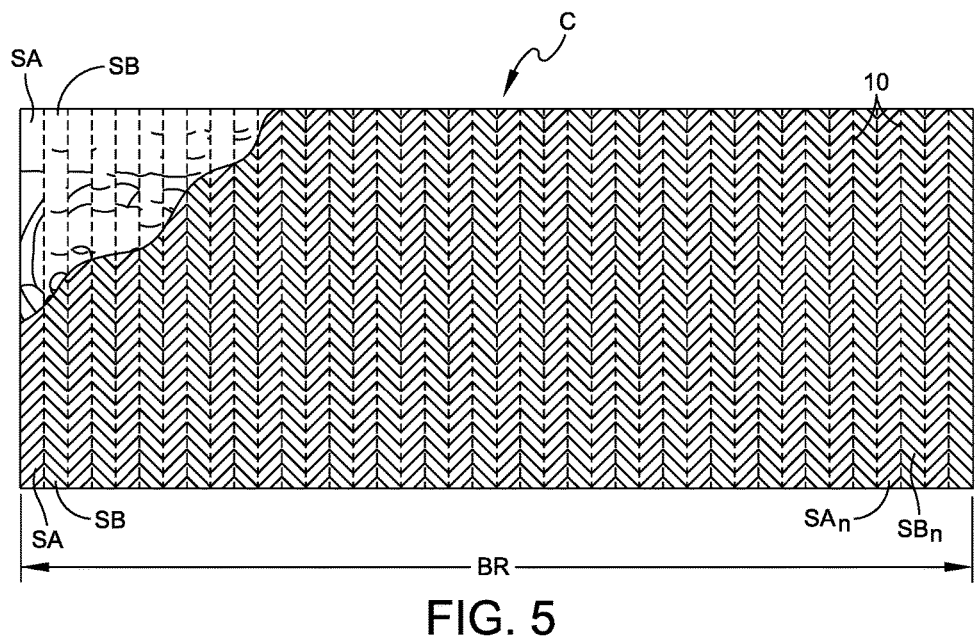
FIG. 5 is a plan view of the composite photograph showing only a portion of the photograph content with the remaining content, for illustrative purposes, indicated by opposed hash lines.
Figure 6:
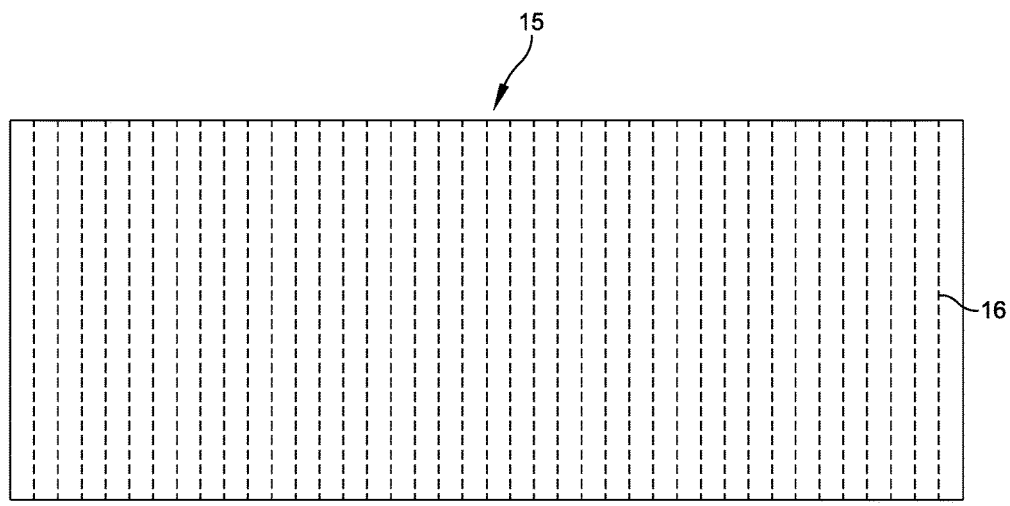
FIG. 6 is a plan view of a template that may be employed in accordance with the present invention.

The illustration of FIG. 5 may be construed as a point where the composite photograph is essentially in a planar state. However, for the proper mounting of the composite photograph, the photograph C is to be scored along lines 10 and essentially folded along those score lines into a series of sequential triangular pieces, as depicted in FIG. 9.

As indicated previously, the diagram of FIG. 10 is meant to illustrate basically three different viewing angles of the finally mounted photograph on the mounting substrate 20. FIG. 10A is a further schematic illustration in a plan view showing the left and right viewing angles for the respective photos to be observed. The mounting substrate 20 is substantially planar. However, as illustrated in FIGS. 10 and 10A, by viewing from the left at, for example, a 45 degree angle to the mounting substrate, one observes substantially only photograph B. On the other hand, by viewing the substrate to the right at, for example, a 45 degree angle to the mounting substrate as also illustrated in FIG. 10, one observes substantially only photograph A. FIGS. 10 and 10A also illustrate a direct frontal observation which is of the composite photograph C which includes alternating photograph segments that are thus then all observed, although this observation has each segment observed at an angle. Photograph C is not considered as a meaningful photograph to observe in that it is a mixture of both photograph segments. As the observe moves from a center position either right or left, once the observer reaches an angle around 45 degrees then only the one photograph is observed; photograph A from the right and photograph B from the left. As the observer moves closer to this 45 degree position the respective photograph becomes more complete and clear.

Again, reference has been made previously to FIG. 11 that shows photographs A and B as well as the respective storage devices 32 and 34. These storage devices 32 and 34 along with the mixer or multiplexer 36 are considered as part of a conventional computer system 30. The output from the multiplexer or mixer 36 is representative of the composite and sliced photographs as is illustrated in FIG. 5. As part of the process, the generated composite photograph C is then scored and folded. The following step is to then apply the scored and folded composite photograph to the mounting substrate 20 illustrated in FIG. 7. FIG. 9 depicts the composite photograph C so mounted and also depicts a peripheral frame portion 25 about the entire periphery of the substrate that may receive a frame (not shown).

Figure 12:
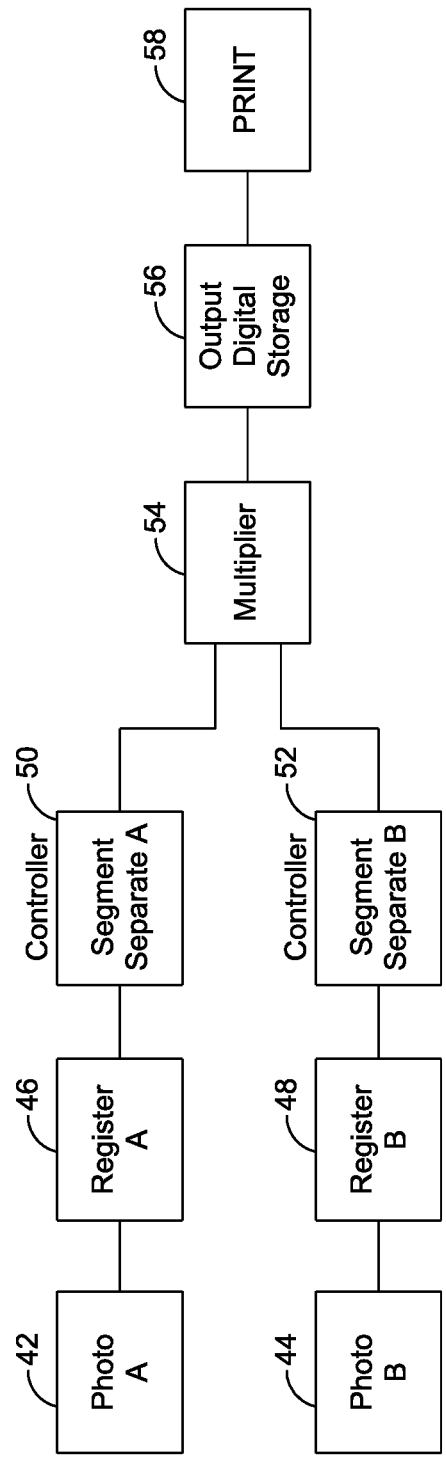
FIG. 12 is an electronic block diagram like that shown in FIG. 11 with further details for explaining the principles of the present invention.

Reference is now also made to FIG. 12 that is a more detailed diagram of the imaging system for creating the photograph composite that is viewable from alternate positions. In FIG. 12 there are shown photographs A and B, respectively at 42 and 44. FIG. 12 also depicts the two registers for digitally storing these photographs, as the respective storage devices or registers 46 and 48. In the block diagram of FIG. 12 after the registers 46 and 48, there are respective segment registers or controllers 50 and 52. Each of the controllers 50 and 52 stores respective digital segments of each stored photograph. The outputs of the respective controllers 50, 52 lead to the mixer or multiplexer 54, as in the diagram of FIG. 11. The devices 46, 48, 50 and 52, along with the mixer or multiplexer 54 are considered as part of a conventional computer system. The output from the multiplexer or mixer 54 connects, as shown in FIG. 12, to the output digital storage device 56. The output from the device 56 is representative of the composite and sliced photographs, such as is illustrated in FIG. 5. As part of the process, the generated composite photograph C is then scored and folded. The following step is to then apply the scored and folded composite photograph to the mounting substrate 20 illustrated in FIG. 7. FIG. 9 depicts the composite photograph C so mounted and also depicts a peripheral frame portion 25 about the entire periphery of the substrate that may receive a frame (not shown).

Having now described one preferred embodiment of the present invention, it should be apparent to those skilled in the art that numerous other embodiments and modifications thereof are contemplated as falling within the scope of the present invention as defined by the appended claims.

What is claimed is:

1. A system for merging multiple photographs comprising:
   a first electronic register for storing a first photograph;
   a second electronic register for storing a second photograph;
   a first separation controller coupled from said first electronic register for establishing a series of vertically-arranged first photograph segments of the first photograph;

a second separation controller coupled from said second electronic register for establishing a series of vertically-arranged second photograph segments of the second photograph;

a multiplexer for receiving the respective vertically-arranged first and second photograph segments, mixing the respective vertically-arranged first and second photograph segments, and alternating the placement of the respective vertically-arranged first and second photograph segments to form, from the respective vertically-arranged first and second photograph segments, a composite photograph in which the respective vertically-arranged first and second photograph segments alternate in position across a width of the composite photograph;

in combination with a support substrate for the composite photograph;

wherein the support substrate includes a rib structure mounted on a mounting surface of the substrate, said rib structure constructed and arranged to form a series of juxtaposition ribs formed in a parallel array;

wherein each vertically-arranged first photograph segment is configured as a rectangular photograph segment;

wherein each vertically-arranged second photograph segment is configured as a rectangular photograph segment;

wherein the rib structure is configured as a repeating triangular waveform pattern of contiguous rectangular rib structure portions that are arranged to define respective peaks and valleys with the peaks being arranged spaced apart in the parallel array;

and wherein said composite photograph is constructed and arranged for mating support over the rib structure.

2. The system of claim 1 wherein the first and second photographs are stored in a digital format.

3. The system of claim 2 wherein the first separation controller includes a first digital memory storage.

4. The system of claim 3 wherein the second separation controller includes a second digital memory storage.

5. The system of claim 4 including an output storage for receiving the composite photograph.

6. The system of claim 1 wherein both the rectangular segments of the photograph and the rectangular portions of the rib structure are planar, the rectangular segments of the composite photograph respectively overlay the rectangular portions of the rib structure.

7. The system of claim 6 wherein each respective rectangular segment of the composite photograph is of the same size as the rectangular portion of the rib structure.

8. The system of claim 7 wherein said composite photograph is a single composite photograph that is formed in a folded array that includes fold lines that correspond to a demarcation line between respective photograph segments, said folded single composite photograph constructed and arranged for mating support to said rib structure by means of the use of an adhesive for securing the single composite photograph to the rib structure.

9. The system of claim 1 wherein the rib structure is formed as a series of ribs that are spaced apart from each other.

10. The system of claim 1 wherein the rib structure is formed as a single rib structure disposed across substantially the entire width of the substrate mounting surface.

11. The system of claim 1 wherein the substrate has a peripheral frame portion, and a frame for receiving and covering the peripheral frame portion of the substrate.

12. A method for merging multiple photographs comprising the steps of:
storing a first photograph;
storing a second photograph;
converting the first photograph in order to establish a series of vertically-arranged first photograph segments of the first photograph;
converting the second photograph in order to establish a series of vertically-arranged second photograph segments of the second photograph;
mixing the respective vertically-arranged first and second photograph segments by alternating the placement of the respective vertically-arranged first and second photograph segments to form, from the respective vertically-arranged first and second photograph segments, a composite photograph in which the respective vertically-arranged first and second photograph segments alternate in position across a width of the composite photograph;
providing a support substrate for the composite photograph;
wherein the support substrate includes a rib structure mounted on a mounting surface of the substrate;
forming said rib structure in a series of juxtaposition ribs disposed in a spaced apart parallel array;
configuring each vertically-arranged first photograph segment as a rectangular photograph segment;
configuring each vertically-arranged second photograph segment as a rectangular photograph segment;
configuring the rib structure as a repeating triangular waveform pattern of contiguous rectangular rib structure portions;
and constructing and arranging the composite photograph in position for mating support over the rib structure.

13. The method of claim 12 including storing the first and second photographs in a digital format.

14. The method of claim 12 wherein the step of converting the first photograph includes providing a first digital memory storage.

15. The method of claim 14 wherein the step of converting the second photograph includes providing a second digital memory storage.

16. The method of claim 12 including supporting the composite photograph as a single composite photograph in a folded manner including fold lines provided between adjacent photograph segment pairs, and wherein the rectangular segments of the photograph and the rectangular portions of the rib structure are both non-arcuate.

17. The method of claim 16 including providing the rib structure as a saw tooth pattern having respective peaks and valleys, and providing the fold lines in alternating opposite directions so that the single composite photograph has the fold lines coincide with the respective peaks and valleys of the rib structure, and wherein the rectangular segments of the composite photograph respectively overlay the rectangular portions of the rib structure.

18. The method of claim 16 including providing the fold lines as alternating peak and valley fold lines, and adhesively applying the single composite photograph against the rib structure with the peak fold line aligning with the peak of the rib structure and the valley fold line aligning with the valley of the rib structure.

19. The method of claim 12 wherein the step of providing a substrate includes providing a rib structure that is formed as a series of ribs that are spaced apart from each other.

20. The method of claim 12 wherein the step of providing a substrate includes providing a rib structure that is formed as a single rib structure disposed across substantially the entire width of the substrate mounting surface.

21. The method of claim 12 wherein the step of providing a substrate includes providing the substrate with a peripheral frame portion, and furthermore providing a frame for receiving and covering the peripheral frame portion of the substrate.

* * * * *